(12) United States Patent
Totten et al.

(10) Patent No.: US 9,481,448 B2
(45) Date of Patent: Nov. 1, 2016

(54) AERODYNAMIC FAIRINGS SECONDARILY ATTACHED TO NOSECONE

(71) Applicant: Rolls-Royce Corporation, Indianapolis, IN (US)

(72) Inventors: Trevor John Totten, Avon, IN (US); Jonathan Michael Rivers, Indianapolis, IN (US); Eric William Engebretsen, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 496 days.

(21) Appl. No.: 14/035,571

(22) Filed: Sep. 24, 2013

(65) Prior Publication Data
US 2014/0255204 A1 Sep. 11, 2014

Related U.S. Application Data

(60) Provisional application No. 61/776,563, filed on Mar. 11, 2013.

(51) Int. Cl.
  *B64C 11/14* (2006.01)
  *F01D 5/06* (2006.01)
  *F02C 7/04* (2006.01)

(52) U.S. Cl.
  CPC .............. *B64C 11/14* (2013.01); *F01D 5/066* (2013.01); *F02C 7/04* (2013.01); *F05D 2300/603* (2013.01); *Y10T 29/49336* (2015.01); *Y10T 156/10* (2015.01)

(58) Field of Classification Search
  CPC ....... B64C 11/14; B64C 23/00; B64C 23/02; B64C 23/08; F01D 5/066; F02C 7/04; F02C 7/042; F05D 2300/603
  USPC ....................................................... 416/245 R
  See application file for complete search history.

(56) References Cited

U.S. PATENT DOCUMENTS 3,508,842 A    4/1970  Lievens
4,256,435 A    3/1981  Eckel
(Continued)

FOREIGN PATENT DOCUMENTS

EP  0850831 A2  1/1998
EP  2096029 A2  2/2009
GB  2364748 A   6/2002

OTHER PUBLICATIONS

Snap-Fit Design Manual (2007 | retrieved online Feb. 15, 2016 | http://web.mit.edu/2.75/resources/random/Snap-Fit%20Design%20Manual.pdf).*
(Continued)

*Primary Examiner* — Christopher Verdier
*Assistant Examiner* — Juan G Flores
(74) *Attorney, Agent, or Firm* — Fishman Stewart PLLC

(57) ABSTRACT

An aerodynamic fan nosecone for a gas turbine engine is provided and includes a fan nosecone that may be made of composite material. To improve airflow transition to the blade members, aerodynamic fairings are provided and are secured to an exterior surface of the nosecone which enhances fuel economy. The fairings may be secured to the nosecone by various methods, including providing for the fairings to be changed out and replaced with other fairings on the same nosecone assembly.

19 Claims, 3 Drawing Sheets

(56) References Cited

U.S. PATENT DOCUMENTS

| | | |
|---|---|---|
| 4,931,026 A | 6/1990 | Woodland |
| 5,230,603 A | 7/1993 | Day |
| 5,800,121 A | 9/1998 | Fanelli |
| 6,358,014 B1 | 3/2002 | Chou et al. |
| 7,048,505 B2* | 5/2006 | Segota et al. ........... B63B 1/248 244/130 |
| 7,419,364 B2 | 9/2008 | Ramstein et al. |
| 7,721,526 B2* | 5/2010 | Fujimura et al. ......... F02K 3/06 416/245 R |
| 8,221,080 B2 | 7/2012 | Clemen |
| 2008/0022524 A1 | 1/2008 | Schreiber |
| 2014/0186166 A1* | 7/2014 | Kostka .................... F01D 5/146 415/182.1 |

OTHER PUBLICATIONS

International Search Report, Int'l. App. No. PCT/US2013/066486, Dec. 19, 2013.

* cited by examiner

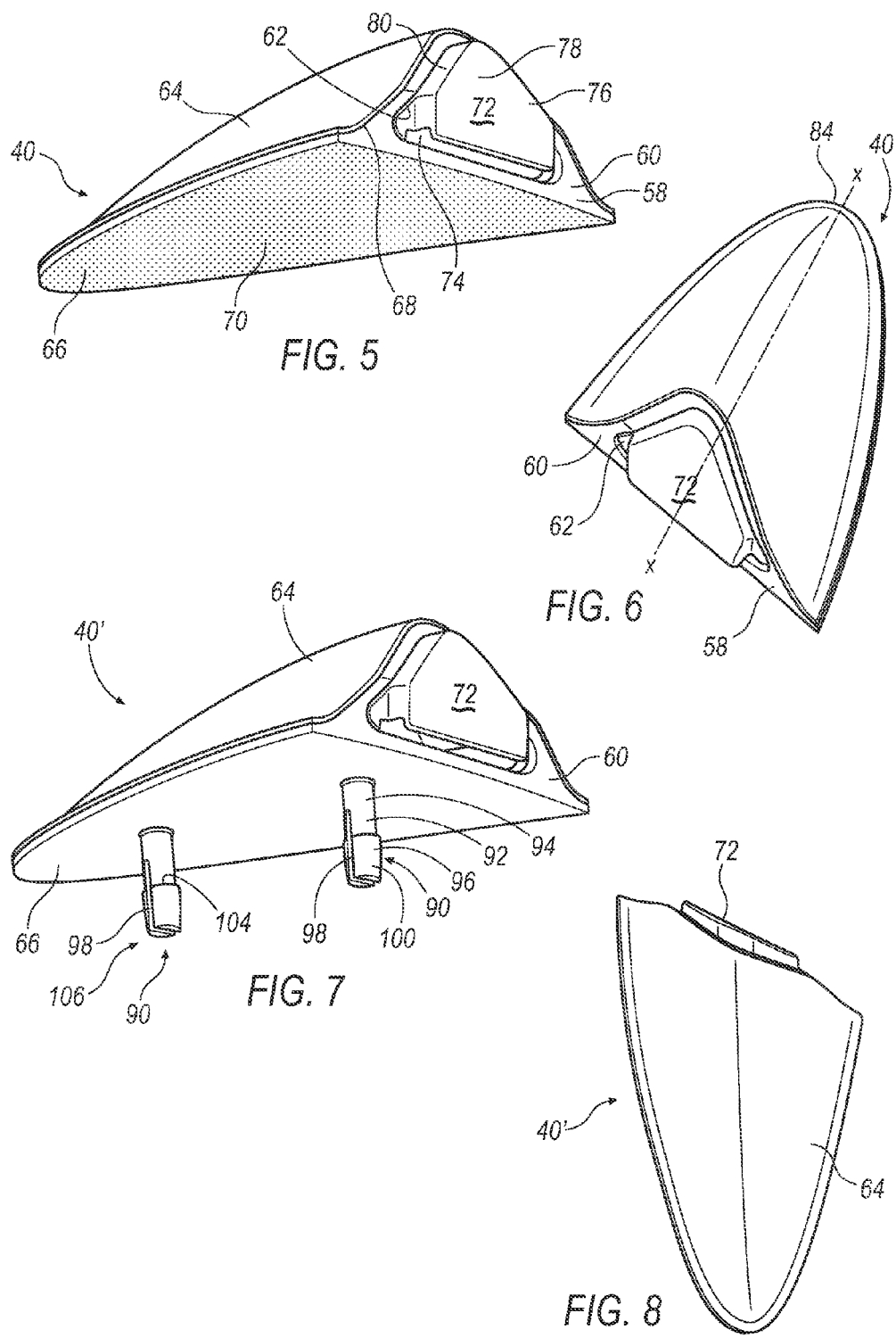

AERODYNAMIC FAIRINGS SECONDARILY ATTACHED TO NOSECONE

CROSS-REFERENCE TO RELATED APPLICATIONS

This application claims priority to U.S. Provisional Patent Application No. 61/776,563, filed Mar. 11, 2013, the contents of which are hereby incorporated in their entirety.

FIELD OF TECHNOLOGY

An improved nosecone assembly for a gas turbine engine is disclosed, and more particularly, an improved composite nosecone component having secondarily attached aerodynamic fairing features that are attached to a surface of the nosecone component.

BACKGROUND

It has become increasingly desirable to provide a 3-D nosecone or spinner that is made of woven composite material, which in turn provides a structurally sound component for a gas turbine engine that is light weight and highly durable. Composite material nosecones provide significant weight advantages over traditional metal nosecone constructs which are typically more expensive due to the rising cost of aerospace materials and the high cost of manufacturing.

A gas turbine engine's performance is influenced in part by the aerodynamic flow across the surface of the nosecone as well as by the shape of the fan blades that are positioned adjacent to the trailing edge of the nosecone. The surface of the nosecone may be modified so as to improve performance. However, modifying only the surface of the nosecone has limited benefits and are insufficient to reach the level of enhanced aerodynamic performance that is demanded by the industry.

Specific fuel consumption of a gas turbine engine can be improved if the air flow transitioning from the nosecone to the leading edge of the fan blade is kept as much as possible in a laminar state of flow. Thus, it would be desirable to provide enhanced laminar airflow in a transition zone between the trailing edge of the nosecone and the fan blades in the hub region. This could be accomplished by providing an aerodynamic member on the trailing edge of the nosecone. The problem, however, is that it is difficult to construct a composite nosecone that also includes integral or even separate aerodynamic features for directing the airflow around the blade leading edge of a fan. It would be desirable to overcome this problem and provide a device that enhances air flow around the blade leading edge, which may be blunt and thus, may generate turbulent air flow.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 5 illustrates a perspective view of a fairing member that is shown in the FIG. 3 device;

FIG. 6 illustrates a top view of the FIG. 5 fairing member;

FIG. 7 illustrates an alternative fairing member, showing its attachment features which engage openings in the surface of a nosecone; and FIG. 8 is a top view of the FIG. 7 fairing member.

DETAILED DESCRIPTION

Exemplary illustrations of a nosecone assembly having a composite body with fairings secured to the composite body are described herein and are shown in the attached drawings. Exemplary nosecone assemblies may include a one-piece aerodynamic fan nosecone assembly having a fan nosecone composite body with a leading edge and a trailing edge. The nosecone assembly may also have an aerodynamic exterior surface that extends between the leading edge and the trailing edge. One or more aerodynamic fairings or bumps may be affixed to the exterior surface of the nosecone.

Another exemplary illustration includes providing a method of manufacturing a spinner component which may include an aerodynamic nosecone having a parabolic surface extending from a tip of the nosecone to a rear edge of the nosecone. The method of manufacturing may further include the step of providing at least one aerodynamic fairing which has a base with a profiled surface, an attachment surface and a cavity. The fairing may further have a filler material with a first portion that is located within the cavity and a second portion that is located outside of the cavity. The method of manufacturing could also include the step of attaching at least one fairing to the nosecone at a location near the rear edge of the nosecone such that the second portion of the filler material extends beyond the rear edge of the nosecone to form a seal between the nosecone and the leading edge. Other aspects of the disclosure will become apparent and are set forth below.

Figure 1:
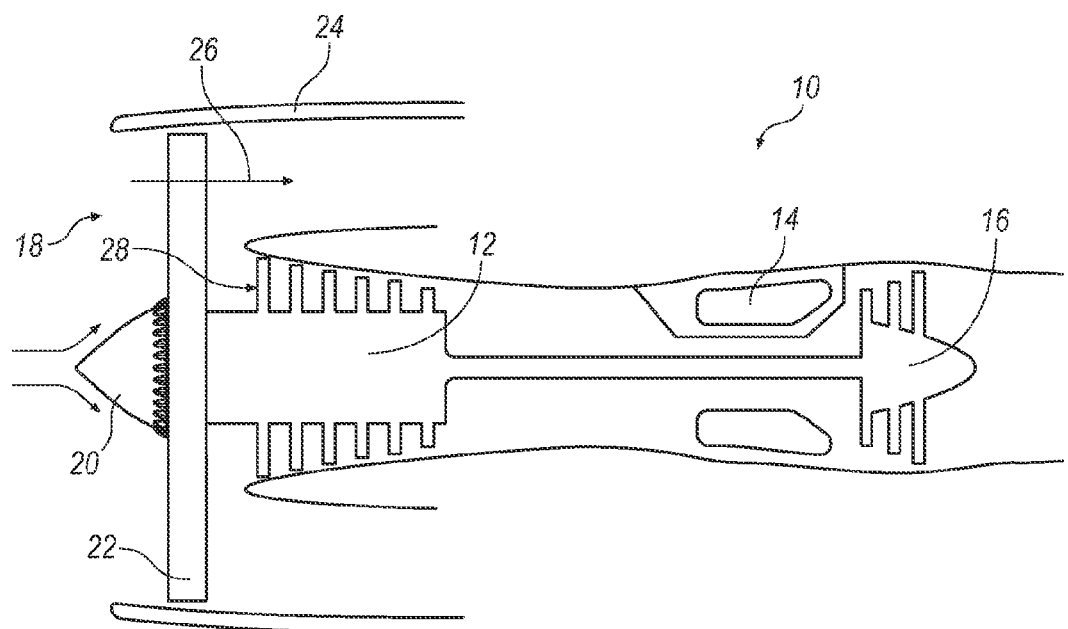
FIG. 1 illustrates a side schematic view of a gas turbine engine employing the improvements discussed herein.

Turning now to the drawings, FIG. 1 illustrates a schematic diagram of a gas turbine machine 10 utilizing the improvements disclosed herein. The turbine machine 10 includes a compressor 12, a combustor 14 and a turbine 16. A fan 18 includes a nosecone assembly 20, blade members 22 and a fan casing 24. The blade members 22 direct low pressure air to a bypass flow path 26 and to the compressor intake 28, which in turn provides airflow to compressor 12. The nosecone assembly 20 generates turbulent airflow, which in turn is directed across the surface of the blade member 22.

Figure 2:
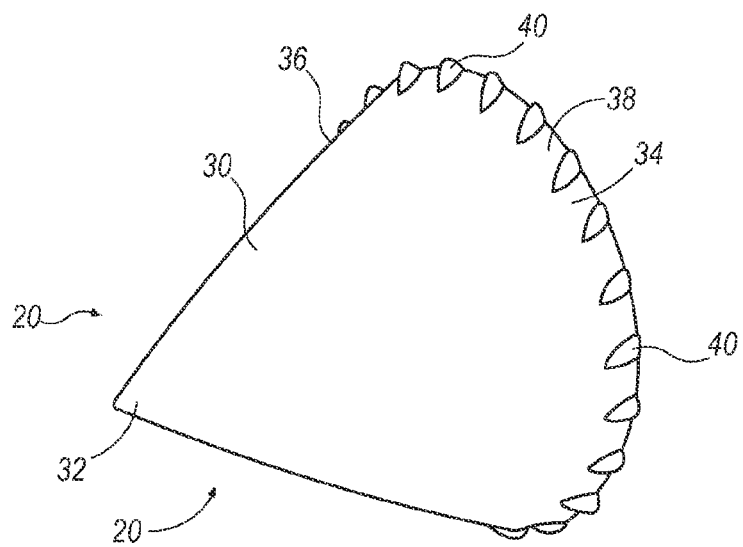
FIG. 2 illustrates a perspective view of a nosecone with aerodynamic fairings that are attached around a perimeter of the trailing edge of the nosecone.

FIG. 2 illustrates a perspective view of the nosecone assembly 20 that is depicted in FIG. 1. It will be appreciated that the nosecone 20 could be made of a variety of composite materials including, but not limited to, filament-wound threads that collectively form a parabolic-shaped structure having a smooth exterior finished aerodynamic surface. The nosecone assembly 20 includes a body 30 having a leading point 32 and a trailing edge 34. An aerodynamic profile with an exterior surface 36 extends between the leading point 32 and the trailing edge 34. The trailing edge 34 has a periphery 38 for receiving a plurality of aerodynamic fairings 40 that are spaced about the periphery 38 at equal distances extending therebetween. In the example provided, approximately twenty aerodynamic fairings are equally spaced around the periphery 38 of the nosecone body 30. Each fairing 40 is positioned to the rear edge of the nosecone body 30 for aiding in providing smooth transitional laminar airflow to a leading edge of the blade member 22. More, or fewer, fairings 40 can be employed, and they can be positioned differently.

Figure 3:
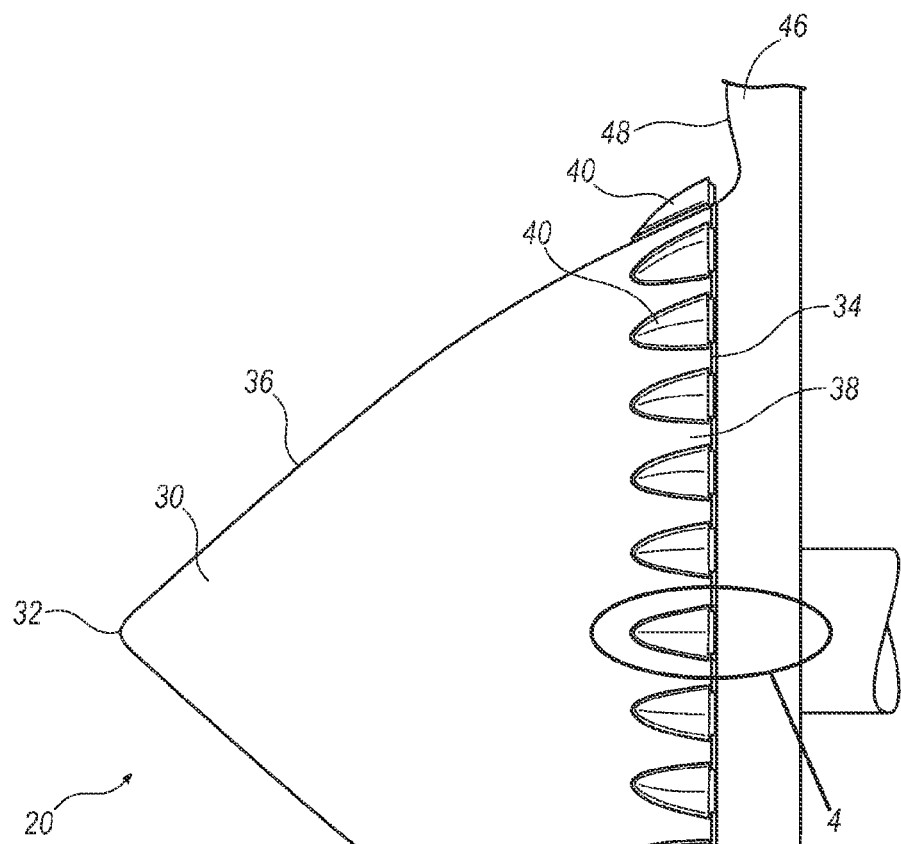
FIG. 3 illustrates an enlarged side-elevational view of the FIG. 2 device, showing the fairings attached to the nosecone.

FIG. 3 illustrates an enlarged side elevational view of the nosecone assembly 20. Each fairing 40 is shown secured to the exterior surface of the aerodynamic profile 36 and they are equally spaced around the periphery 38 so as to provide uniform balanced operation when under power. The underside of each fairing 40 has a contoured attachment surface 66 (FIG. 5) that mirrors the corresponding surface on the aerodynamic profile 36 to which it is received. Thus, a smooth gap-free interface is present between the transition area of the fairing 40 and the aerodynamic profile 36.

The blade member 22 includes a leading edge 48 that is adjacent to each of the fairings 40. The blade member 22 further includes a plurality of blades 46, each of which having their own leading edge 48. A transition zone 50 is defined by the fairing 40 and the leading edge 48, which in this example, aerodynamic flow in the transition zone 50 is improved so as to improve specific fuel consumption. This is due in part to the fairings 40 directing airflow around the leading edge 48.

Each fairing 40 may be secured to the aerodynamic profile 36 by various methods. For example, fairing 40 may be chemically secured to the exterior profile of the nosecone by using adhesives. Alternatively the fairing 40 (as shown in FIG. 3) may be mechanically fastened or otherwise secured to the exterior surface 36 of the nosecone body 30 through the use of a mechanical attachment feature such as, but not limited to, pins, pegs, bolts, slots, and other mechanical methodologies and devices. It will be appreciated that other methods of securing the fairings 40 to the nosecone body 30 are contemplated, including methods and devices that permit the fairing 40 to be removably replaced with other fairings 40. Thus, the fairing 40 can be interchangeable.

Figure 4:
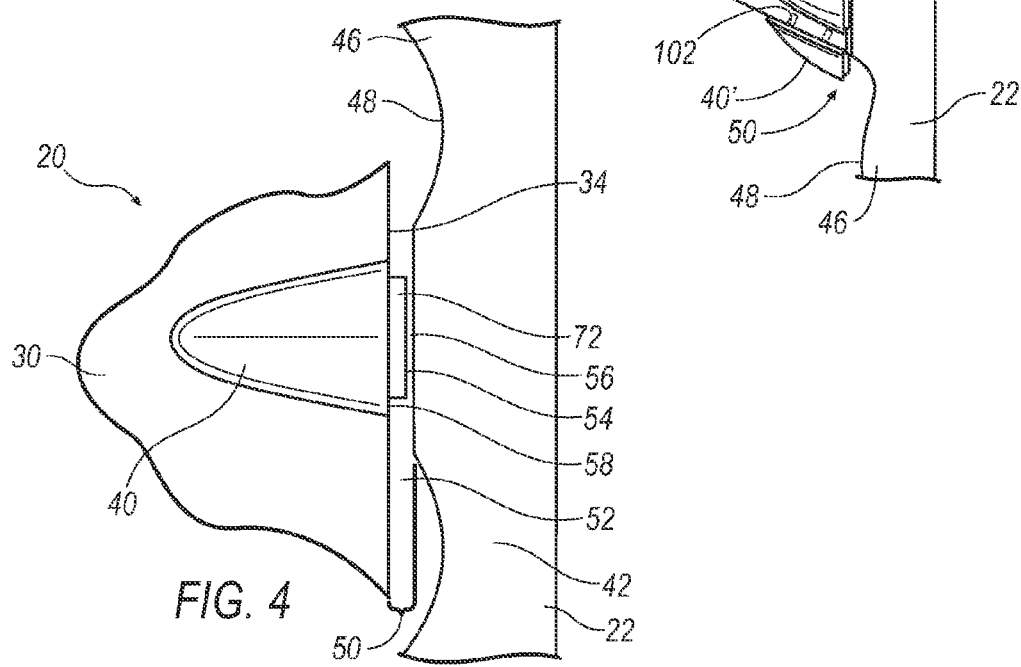
FIG. 4 illustrates an enlarged partial side sectional view taken from circle 4 of FIG. 3, showing a fairing and the transition zone leading to a blade member.

FIG. 4 illustrates a partial side-sectional view taken from circle four of FIG. 3, illustrating one fairing of 40 shown mounted on the body 30 of the nosecone assembly 20. A leading edge 48 of the blade member 22 is shown slightly offset from the trailing edge 34 of the nosecone body 30. A gap 52 may extend between the trailing edge 34 of the nosecone assembly 20 and the leading edge 48. It is preferable to minimize the gap 52 so as to enhance aerodynamic laminar flow in the transition zone 50. A seal 54 extends from the fairing 40 and into the gap 52 to provide a much smaller transitional or minimal gap 56. The pads 72 can touch the blades 46. Therefore, gap 56 may not, and perhaps should not, exist. The minimal gap 56 can be so minimal that an aerodynamic seal 54 is created between the fairing 40 and the hub 42 so as to improve air flow around the leading edge 48. The rear surface 58 of the fairing 40 is lined up flush with the trailing edge of 34 of the nosecone body 30.

FIG. 5 illustrates an exemplary fairing 40 and its constituent components. It will be appreciated that fairing 40 could have other ornamental or aerodynamic configurations and it could also be referred to as a 3-D aerodynamic structure, bump, deflector, or the like. The fairing 40 has a base 60, a cavity 62, a surface coating 64 and an attachment surface 66. The base includes a profiled surface 68 which, it will be appreciated, can be comprised of other surface configurations apart from that depicted in this exemplary illustration. The base 60 further includes a rear surface 58 that is substantially planer which leads into cavity 62. The attachment surface 66 is non-linear and it substantially matches the parabolic curvature of the aerodynamic profile 36 of the nosecone body 30. The attachment surface 66 can include an adhesive material 70 for creating a frictional bond between the fairing 40' and the aerodynamic profile 36 of the nosecone body 30. The base 60 is constructed to be sufficiently ridged to be impact resistant and may be made of composite, metallic, plastic or other similar type materials.

The fairing 40 further includes a filler material, or pad 72, which could be made of an elastomer, organic material composite, or other similar type materials. The pad 72 extends substantially within the cavity 62 and is rigidly secured to the cavity 62 mechanically, chemically, or by other methods. The pad 72 includes a first portion 74 that extends axially substantially within the cavity 62, and a second portion 76 protruding from the cavity. The second portion 76 has a substantially planer face 78 with a large cross sectional area for enhancing laminar air flow to the leading edge 48. An offset portion 80 of the pad 72 extends past the rear surface 58 of the base 60 a preferred distance to reduce the gap 52 that extends between the nosecone trailing edge 34 and the leading edge 48 of the blade member. The offset portion 80 acts as a seal 54 (FIG. 4) to minimize the gap 56 in the transition zone 50.

It will be appreciated that the cavity 62 may be partially filled by the pad 72. For example, other materials could be positioned within the cavity 62, apart from the pad 72. Also, the cavity 62 may extend across a substantial width of the rear surface 58 and may extend axially along axis X-X a depth of the base 60. The depth could extend near the tip or the end 84 (see FIG. 6) of the base or the depth could be only partially into the base 60.

The surface coating 64 extends over substantially the entire contoured profile surface 68 of the fairing 40. The surface coating 64 provides an outer skin over the surface 68 and is made preferably of paint. The thickness of the coating 64 may be approximately 1 mm, and has a low coefficient of friction.

FIG. 6 illustrates a top view of the FIG. 5 fairing 40. The pad 72 is shown located partially within the cavity 62. An axis X-X extends along the length of the fairing 40 and the cavity 62 may extend along axis X-X a substantial distance along the axis.

FIGS. 7 and 8 illustrate an alternative fairing assembly of 40', which includes many of the same features and components as discussed in the FIG. 5 embodiment. Thus, where possible, like numbers and references are provided and will not be repeated in this discussion.

The alternative fairing assembly of 40' has protruding and extending from the attachment surface 66 an attachment feature 90 extending substantially perpendicular to the attachment surface 66. Each attachment feature 90 has a perpendicularly extending member 92 with a first diameter 94 and an enlarged second diameter 96. A slot 98 extends axially a substantial distance within the member 92, which in turn allows the outwardly extending tip 100 to be collapsible when under load. It will be appreciated that two attachment features 90 are shown in connection with the alternative fairing 40'. However, a single, or a plurality of attachment features 90 may be employed. The features 90 may be integrated with the base 60 or they can be a separate component, but either way, they are preferably rigidly secured so that the body 60 and features 90 perform as a rigid unitary assembly. It is possible that the body 60 and the features 90 could be molded as one integral assembly.

Each attachment feature 90 is designed to fit within mounting apertures 102 that appear in the aerodynamic profile surface 36 of the nosecone assembly 20. (FIG. 3). Here, an alternative fairing 40' is shown rigidly secured to the lower portion of exterior profile 36 by inserting each attachment feature 90 into its corresponding hole 102. A tab 104 extends around the perimeter of the second diameter 96 and creates a locking feature 106 whereby the fairing 40' snaps into place and thus, is rigidly secured to the body 30 of the nosecone 20.

The fairing 40' could be dissembled from the body 30 by reaching inside the nosecone body 30 and compressing the tip 100 so as to allow for the attachment feature 90 to be disengaged from the mounting holes 102. Thus, the fairing 40' is detachable and may be replaced with yet different fairings, if so desired. Accordingly, a modifiable nosecone assembly 20 is presented which, in one instance may have a fairing 40' with a certain profile, but then later can be modified to have a fairing 40' with a different profile. The nosecone 20, therefore, is reconfigurable.

A method of manufacturing a nosecone will now be described. First, a composite aerodynamic nosecone will be provided having a leading edge portion and a trailing edge portion with a contoured surface extending between the edge portions. Next, an aerodynamic fairing will be provided, the fairing having a base with a profiled surface, an attachment surface and a cavity. The fairing further has a pad with a first portion that is located within the cavity and a second portion that is located outside of the cavity which creates an over flush type arrangement. The next step is to attach at least one aerodynamic fairing to the nosecone. The fairing may be attached near the trailing edge of the nosecone such that the second portion of the pad extends beyond the trailing edge of the nosecone. This improved assembly operates to provide a seal between the pad and the hub 42.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A one-piece aerodynamic fan nosecone assembly comprising:
    a fan nosecone having a leading edge and a trailing edge with an aerodynamic exterior surface extending between the leading and trailing edge;
    a plurality of aerodynamic fairings spaced apart and affixed to said aerodynamic exterior surface of the fan nosecone, at least one of the fairings including:
    a base having an aerodynamic portion, and
    an attachment feature that mounts an underside of the base to the fan nosecone;
    and an insert having a portion projecting from the base that enhances aerodynamic sealing between the fan nosecone and a blade member, wherein the insert includes a filler material.

2. The nosecone assembly as claimed in claim 1, further comprising a mechanical connection between the fan nosecone and at least one fairing.

3. The nosecone assembly as claimed in claim 1, further comprising a pair of male members extending downwardly from a lower portion of each fairing, each said male member having a locking feature for securing the fairing to the surface of the fan nosecone.

4. The nosecone assembly as claimed in claim 1, further comprising a chemical bond connecting at least one faring to the fan nosecone.

5. The nosecone assembly as claimed in claim 1, wherein the at least one of the fairings includes a surface coating extending over a portion of the base.

6. The nosecone assembly as claimed in claim 1, wherein the base includes a cavity that is sized to receive a portion of the insert.

7. The nosecone assembly as claimed in claim 1, further comprising a seal that is formed as part of the fairing, the seal is located between the fan nosecone and a blade member that is located approximate to the fan nosecone.

8. A spinner for a turbo machine comprising:
    a nosecone member having a leading edge and a trailing edge with an aerodynamic exterior surface extending between the leading and trailing edges; and
    an aerodynamic edge fairing affixed to said aerodynamic exterior surface of the nosecone member, the fairing comprising:
    a base with an aerodynamic surface,
    a seal having a portion that extends within a cavity of the base, and an offset portion that extends past the trailing edge of the nosecone member, and
    an attachment portion that mounts the fairing to the nosecone member.

9. The spinner as claimed in claim 8, further comprising a coating extending over the aerodynamic surface of the base.

10. The spinner as claimed in claim 8, further comprising a plurality of fairings that are equally spaced apart from one another around a periphery of the nosecone member.

11. The spinner as claimed in claim 8, wherein the seal is made of an elastomer or organic material composite.

12. The spinner as claimed in claim 8, wherein the base is made of a composite, metallic or plastic material.

13. The spinner as claimed in claim 8, wherein the nosecone member is made using a filament winding manufacturing process.

14. The spinner as claimed in claim 8, further comprising an insert having a portion projecting from the base that enhances aerodynamic sealing between the nosecone member and a blade member.

15. A method of manufacturing a nosecone component comprising the steps of:
    providing an aerodynamic nosecone having a leading edge portion and a trailing edge portion, a contoured surface extending between the edge portions;
    providing at least one aerodynamic fairing, said fairing having a base with a profiled surface, an attachment surface and a cavity, the fairing further having a filler material with a first portion that is located within the cavity and a second portion that is located outside of the cavity; and attaching at least one aerodynamic fairing to the nosecone at a location near the trailing edge portion such that the second portion of the filler material extends beyond the trailing edge of the nosecone.

16. The method as claimed in claim 15, further comprising providing a hole in the contoured surface of the nosecone and providing an attachment feature on the base, inserting the attachment feature of the base into the hole in the contoured surface of the nosecone.

17. The method as claimed in claim 15, wherein the step of attaching at least one aerodynamic fairing includes chemically bonding the fairing to the nosecone.

18. The method as claimed in claim 15, wherein the step of attaching at least one aerodynamic fairing includes mechanically connecting the fairing to the nosecone.

19. The method as claimed in claim 15, wherein the step of attaching at least one aerodynamic fairing to the nosecone results in a minimal gap between the second portion of the filler material and a leading edge of a blade member to direct laminar air flow around the leading edge of a blade member.

\* \* \* \* \*